Nov. 8, 1960 T. F. PETERSON 2,959,632
SUSPENDED LINE SPACING AND DAMPING
Filed March 23, 1955 3 Sheets-Sheet 2
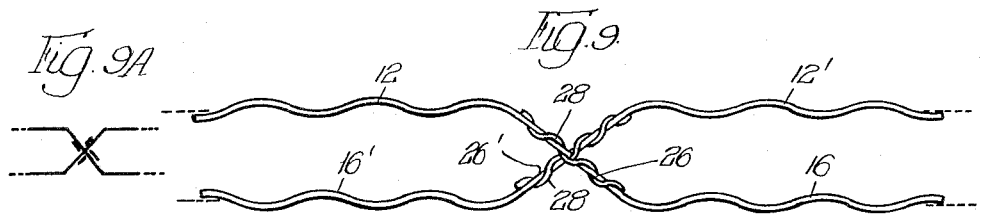
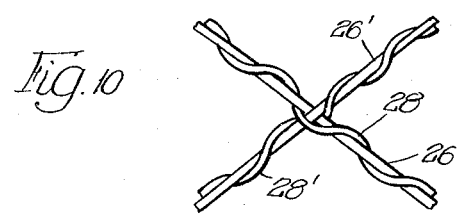
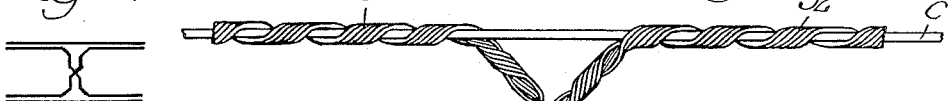
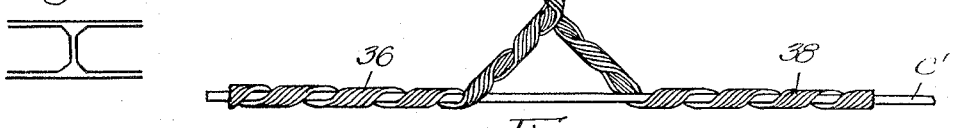
INVENTOR.
Thomas F. Peterson,
BY
Wilkinson Huxley Byron & Hume
Attys.

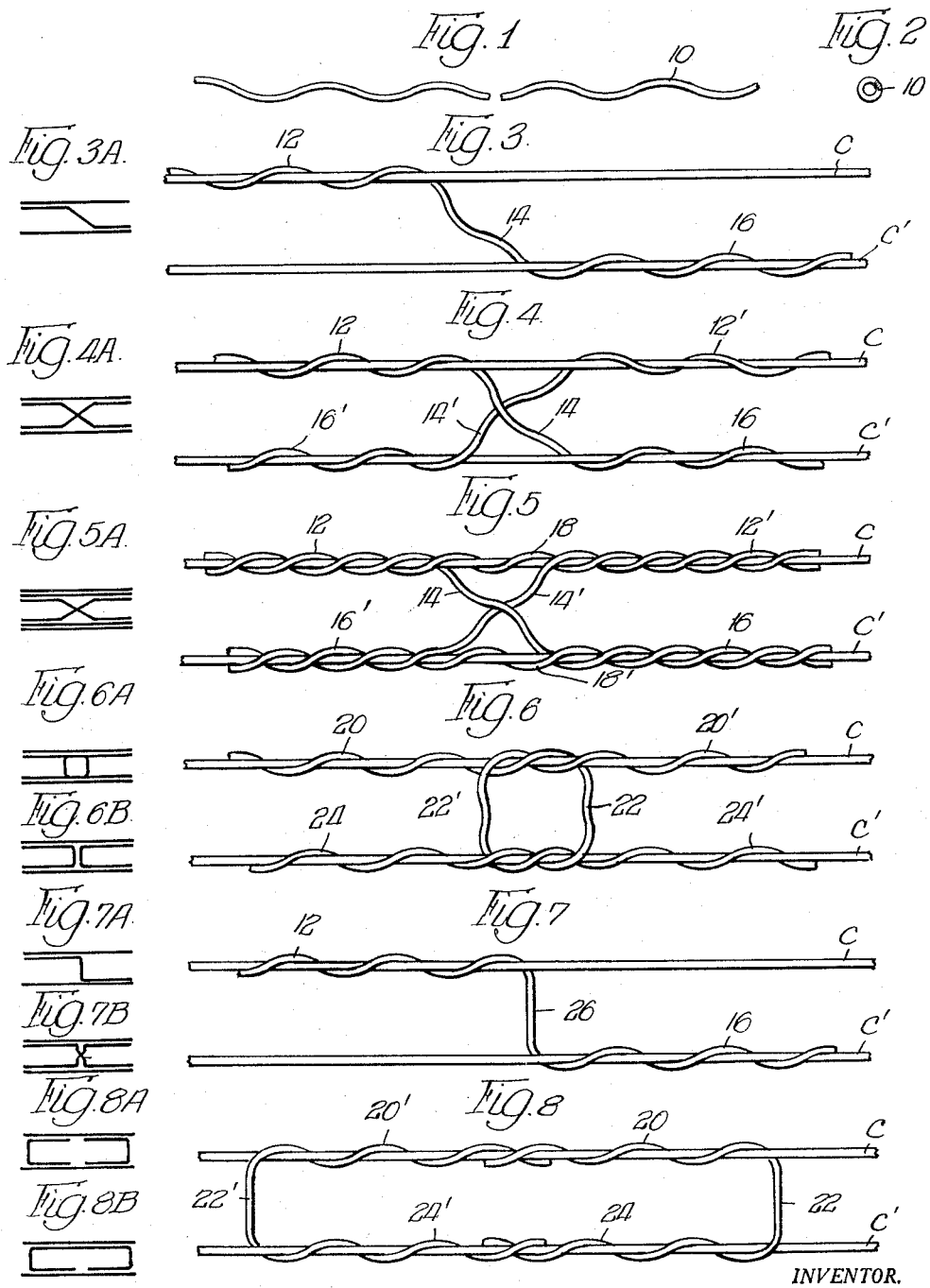

Nov. 8, 1960    T. F. PETERSON    2,959,632
SUSPENDED LINE SPACING AND DAMPING
Filed March 23, 1955    3 Sheets-Sheet 3
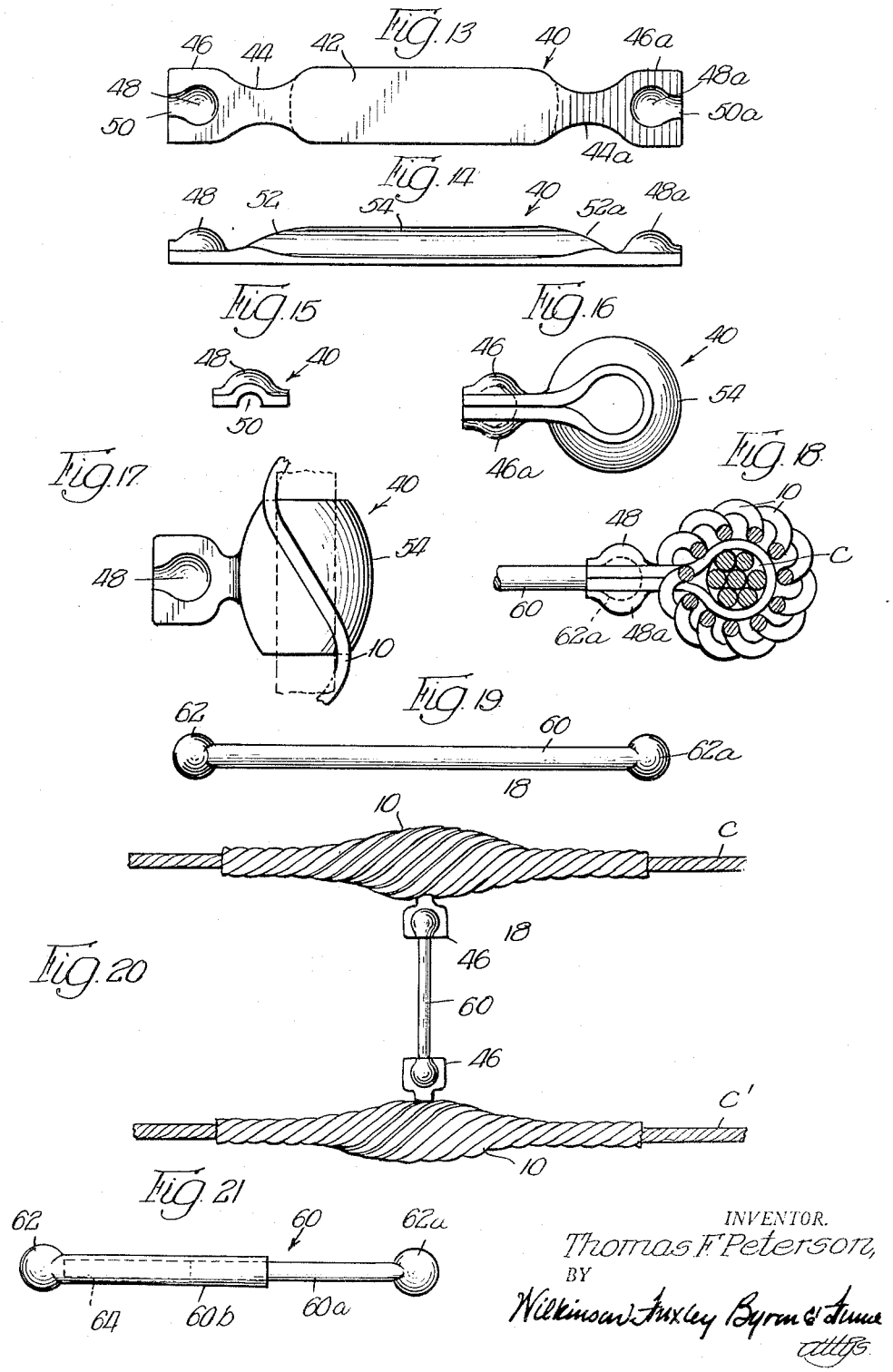
INVENTOR.
Thomas F. Peterson,
BY
Wilkinson, Huxley, Byron & Jones
ATTYS.

United States Patent Office 2,959,632
Patented Nov. 8, 1960

2,959,632

SUSPENDED LINE SPACING AND DAMPING

Thomas F. Peterson, Shaker Heights, Ohio
(1434 Union Commerce Bldg., Cleveland 14, Ohio)

Filed Mar. 23, 1955, Ser. No. 496,107

20 Claims. (Cl. 174—40)

This invention relates to spacers and cross-connectors or braces for suspended lines, such as parallel conductors in overhead electrical transmission systems, although not necessarily limited thereto.

In modern suspended electrical transmission systems, it frequently occurs that conductors are strung in multiple parallel groups, each group sharing an insulator string in common at each of the supporting towers. These are sometimes called bundled conductors or twin conductors where there are only two conductors per phase. This necessitates that the conductors in each group be relatively close together. Modern electrical conductors, which combine good electrical properties with high strength characteristics, have permitted the reduction of the number of suspension towers to as few as six to eight per mile, which has resulted in long catenary spans between supports averaging up to 660 feet or more. It is obvious that in such long catenary spans, conductors running in parallel spaced but slightly over a foot apart, because of differential wind forces, ice loading and/or electro magnetic attraction are apt to swing into contact with each other, with damage arising either from the mechanical abrasion, or from current transfer and arcing where the operating potentials of the conductors differ, to their mutual damage. Even power conductors of a differing phase and spaced up to 10 to 20 feet may sway or swing (as e.g. during galloping) into close enough proximity to result in arcover between lines. Open wire telephone circuits with line wire spaced approximately one foot may, when tensioned lightly to avoid effects of aeolian vibration, swing together and cause repeated "trip outs" of circuits.

These problems have required the introduction of various forms of spacers for the purpose of keeping the conductors apart. For conductors maintained at the same potential, such spacers need not be insulating material, but where a potential difference exists, cross connectors or spacers of good dielectric properties must be employed. Since conductors of similar physical properties are frequently strung in identical spans, the vibration characteristics of one may be harmonically rather closely attuned to those of the other, and where spacers bridge across between parallel runs of conductors, it has been observed, unless provisions were made to prevent it, that the vibrations of one influence those of the other in a manner not unlike that described in most physics texts as a sympathetic vibration. More frequently there is an interference due to slight differences in the several parameter (weight per foot, tension, wind velocity at each conductor, length of conductor between spans and/or attachments) which affect vibration or galloping frequencies, amplitudes, etc.

It is a necessary requirement of spacers that connect adjacent lines that they be easily applied either at one or more points between supports, or at a point adjacent the supporting towers in such a way that they can move toward the mid-span position where they are more effective as spacers and in damping vibrations that set up as a result of wind action.

It is also desirable that spacers afford some resilience in their resistance to the movement of conductors in alleviation of stresses upon the latter, and to be most effective from a vibration damping standpoint.

It is to present a better solution to the foregoing problems that the present invention is directed.

In carrying out the present invention, helically-preformed elements may be made of non-conductive parts similar to the plastic strips shown in my Patent No. 2,275,019, or may be made of one or more helically-preformed metallic elements, as are also covered by said patent, and as are shown in my Patent No. 2,587,521, in my copending applications Serial No. 698,312, filed September 20, 1946, and Serial No. 2,200, filed January 14, 1948, and Patent No. 2,761,273, which matured from a divisional application of application Serial No. 698,312. Also, in still another of my copending applications, Serial No. 89,986, filed April 27, 1949, I have shown the connection and suspension of conductors in parallel by a connector bearing or bridge that is secured to the conductors by means of helically-preformed armor rods (Figs. 33–35).

It is the characteristic of helically-preformed elements that they be formed of a helical internal diameter that is capable of surrounding the conductors of association, and be of a sufficiently open pitch to be wrapped around such conductors without exceeding the elastic limit of the material of which such elements are made without substantial deformation. Where it is desired to prevent relative axial movement between the helical elements and the conductors, the internal diameter of the former is less than the over-all diameter of the conductors so as tightly to grip the latter. Such elements embrace the conductors without the need for clamps or other fittings to maintain them in position.

Similarly, such elements may be used to hold other accessories and appliances to the conductors where such appliances can be disposed in surrounding relation to the conductors and in turn be enveloped by one or more helically-preformed elements, as is taught in my prior application Serial No. 89,986. An adaptation of this idea constitutes a modification of the present invention.

Where axial immobility is not required, the internal helical diameter of the helices may be such as to afford a loose fit upon the conductors so that under conditions of vibration the helices may "walk" along the conductors to an equilibrium point. Additionally, relative radial movement between conductor and helical element may absorb energy (during chattering) and dampen vibration. Soft materials (rubber, plastics, etc.) in contact with conductor are preferred to prevent wear of conductors. Helical plastic tubes alone or over metal helices may be used.

Normal insulating material may be made semi-conducting as described in other applications and patents.

There is shown herein the adaptation of helically-preformed elements to the purposes set forth, a better understanding of which will be afforded by consideration of the ensuing specification read in conjunction with the drawings, in which—

Figures 1 and 2 are side and end views, respectively, of a typical unitary helically-preformed element adapted to the usages of the present invention.

Figure 3 is a plan view of a helically-preformed element applied between adjacent parallel suspended lines, such as electrical conductors.

Figures 4, 5 and 6 are views similar to Figure 3, showing the use of multiple preformed elements applied in various ways between parallel lines for spacing purposes.

Figure 7 shows a single helical element having an intermediate straight portion to bridge between adjacent lines.

Figure 8 is a similar view, showing a pair of preformed elements applied in hair-pin fashion in opposing relation. The same configuration may be realized by the use of a single element as illustrated in the diagram of Figure 8B.

Figure 9 is a plan view of a pair of elements having straight intermediate portions in crossed relation secured together by additional helically-preformed elements to constitute a spacer unit that may be applied to and removed from parallel lines as a unit.

Figure 10 is an enlarged view of the connection shown in Figure 9.

Figure 11 represents the adaptation of a plurality of helically-preformed elements arranged in half sets, or a plurality of plastic strips arranged to perform the spacing function.

Figure 12 is a similar view, in which the adjacent ends of the helical elements are maintained in spaced relation by a dielectric bridge.

All of the figures having a letter suffix—"A" or "B"—and ranging from Figure 3A to Figure 12A, respectively, are diagrammatic representations of the arrangements in the figure of the same numerical designation to which they are adjacent.

Figures 13 and 14 are bottom plan and side elevational views, respectively, of an appliance for use in a modification of the present invention.

Figure 15 is an end view thereof.

Figure 16 is a side elevational view showing the appearance of the appliance as it is wrapped around a conductor.

Figure 17 is a plan view of Figure 16, showing the appearance of the latter in association with one helically-preformed element as applied for holding it to a conductor.

Figure 18 is a fragmentary sectional view showing the appliance, as applied to a conductor in association with a plurality of helically-preformed elements, in engagement with a spacer rod corresponding to section line 18—18 of Figure 20.

Figure 19 is a side view of a spacer rod for use in connection with the appliance of the foregoing figures.

Figure 20 is a plan view of the completely assembled appliance as applied in the spacing of adjacent conductors.

Figure 21 is a side view of a spacer rod having telescoping parts by which a variable spacing between conductors is achieved.

Referring now more particularly to the drawings, in which like characters of reference refer to like parts throughout, one or more helical elements 10, as appear in Figures 1 and 2, may be applied as is shown in Figures 3 and 3A to bridge between adjacent conductors C—C'. As illustrated, the helically-preformed element, or elements, is first wrapped around one of the conductors C, as at 12, and after a suitable number of turns, is carried across to the adjacent conductor in a diagonal bridge 14, and is wrapped around the adjacent conductors C' as at 16. The bridging portion 14 may either be a continuation of the helical preformation of the element or may be a straight portion provided intermediate its end for this purpose, as shown in Figure 7. The diagonal arrangement more effectively breaks up the harmonic phase relation between the conductors, causing the vibrations in each substantially to cancel those in the other, thereby to insure an efficient damping thereof. Where the central bridge 14 is helically preformed, a resilience is imparted which in flexing back and forth in response to the movement of the two conductors absorbs energy therefrom in accomplishment of the damping function.

In Figures 4 and 4A, a pair of preformed elements, one of which is arranged identically as in Figure 3, and the other of which is arranged in cross relation thereto, are bridged between the conductors C and C', so that their central parts 14—14' cross in the middle so as to form an X-shaped configuration, as is shown in the diagram of Figure 4A. Here corresponding parts of the second preformed element are primed to correspond to the parts of the first preformed element already described. The crossed bridging portions 14—14' may be of straight stock intermediate the ends of the elements, if desired.

In the embodiments of Figures 5 and 5A, the arrangement is identical with that described in Figures 4 and 4A, except that additional preformed elements 18—18' are applied, respectively, in surrounding relation to the conductors C—C', so as to occupy the spaces between the turns of the bridging elements in 180° phase relation as viewed in cross-section. These elements 18—18' do not bridge over, but run along their respective conductors to afford additional reinforcements for the latter, and to act as a locking means to retain or position longitudinally within limits the bridging elements in proper relationship in the assembly. It will be understood that the elements constituting the bridging parts may be made of a plurality of preformed armor rods or wires, or plastic tube, or may be made of plastic strips similar in appearance to those shown in Figures 11 and 12; and the elements 18—18' may be similarly constituted to complement the latter to form complete envelopes around the conductor throughout the portions in which all of the preformed elements are coextensive, respectively. This observation is equally applicable to all of the embodiments under discussion herein.

In Figures 6 and 6A, helically-preformed elements are bent hair-pin fashion to have one helical part 20 embracing one of the conductors C, with an intermediate part 22 carried over to the other conductor C' in bridging relation, and thence back along the latter, as is indicated at 24 in Figure 6. One such preformed element may be applied in this fashion to perform the spacing function, or may be employed in conjunction with straight courses of helically-preformed elements similar to 18—18', Figure 5, or may be employed with another similar element applied as in Figure 6, so that its legs 20'—24' extend oppositely to those of the first element, whereby the bridging portions 22—22' form a substantial circle or square through which the spacing function is carried out.

Figure 6A represents the construction shown in Figure 6, in which the bight portions 22—22' of the bridging elements are overlapped; while Figure 6B illustrates a similar arrangement in which the bight portions are brought into proximity with one another without overlapping.

Figure 7, as has already been mentioned, is similar to Figure 3, in that a preformed element has parts 12 and 16 in wrapping engagement with adjacent conductors C—C', respectively, which are connected by a straight bridge portion 26 that leads directly across in normal relation to the conductors, or which may be diagonally disposed as in Figure 3. The straight perpendicular bridge may be adopted where the mutual reinforcement of the vibrations between the conductors is not a concern.

Figure 7B is a diagrammatic representation of two devices similar to that shown in Figure 7, extending oppositely in zigzag fashion, with the bridging parts substantially parallel as in the letter H. It is contemplated that one or more helically-preformed elements (not shown) up to a complete tube thereof, in length equal to the desired spacing between the conductors, be wrapped around the bridging parts 26 to bind them together.

Figure 8 is related to Figure 6 in that a pair of hair-pin elements are arranged upon the conductors as in that figure, only with the bridging portions 22—22' spaced apart to form essentially an open rectangle, preferably with the legs of the hair-pins more or less overlapped, though not necessarily so, since Figure 8A allows some spacing in this regard.

Figure 8B is a diagrammatic representation whereby this same assembly may be made by utilizing one helically-preformed element that is wrapped throughout its middle portions around one of the conductors C, and is bridged between the latter and the adjacent conductor C', with the free ends extending from the bridged portions then being carried back along the second conductor toward each other to a point of termination either in overlapped relation, or somewhat spaced, as appears in Figure 8B.

Figures 9, 9A and 10 depict a pair of helically-preformed elements providing legs 12—12' and 16—16' for engagement around adjacent conductors as previously described, only in this instance having straight intermediate portions 26—26' constituting diagonal bridges in crossed relation. To hold these elements in operative relationship, so that they may be installed and removed as a unit, or to increase the rigidity of the bridge and to afford an increased damping action, auxiliary preformed elements 28—28' may be wrapped in gripping relation around the straight portions of each, respectively, so that one of the auxiliary elements, such as 28 on the bridge 26, passes over the cross bridge 26' before resuming its position around the bridge 26; and the auxiliary element 28', running along in wrapped relation to its bridging part 26', passes under the crossed bridge 26 of the adjacent member. In this way, the crossing bridges are woven together by the auxiliary elements and are locked against relative displacement. This affords a strong resilient connection to guarantee the spacing function while affording some resilient movement for the absorption of vibrational energy.

The device of Figure 11 may be made of half sets of groups of helically-preformed elements, as are shown in my prior application above identified, or may be formed of plastic strips, as are shown in my Patent No. 2,275,019, previously referred to. As is shown in Figures 11A and 11B, the parts associated in the manner shown may be in the form of interconnecting hair-pin elements, in which the legs of each extend in the same direction, but oppositely with respect to the other element; or they may be in connected Z-shapes, in which the legs of each extend in opposite directions, and in which the elements are reversed with respect to each other.

As shown, a preformed element 30 and a preformed element 32 have leg portions disposed along the conductor C, and are diverted from the latter in Y-configuration to an intermediate bridging part 34, where they are coiled together, so that the helix of one complements the helix of the other to form a substantially closed helical portion throughout their coextensivenesss. They are then divided again in a Y, and are directed in wrapped relation to the conductor C', constituting legs 36 and 38 in surrounding relation to the latter. The legs 30 and 36 may be the same element disposed in hair-pin fashion as shown in Figure 11B, in which case legs 32 and 38 would be the corresponding hair-pin configuration of the adjacent element, or the legs 30—38 and 32—36 may be legs of the same elements, respectively, zigzagged in opposite directions, as is represented in Figure 11A.

In Figures 12 and 12A, a condition corresponding to that of Figure 11 is established, except that the bridging part 34 is interrupted and is connected by a dielectric spacer bar 40. In this embodiment, the legs 30—32 are brought in Y-relation from the conductor C, and are wrapped around each other to constitute a tubular portion 42 surrounding the dielectric rod 40 in gripping relation to the latter. Similarly, the parts 36 and 38 are brought in Y-relation from the conductor C' and are wrapped together to constitute a tubular portion 44, also in gripping relation to the dielectric rod 40. The helically-preformed elements in this embodiment may be metallic or non-metallic, since they are maintained substantially in electric isolation by the dielectric rod 40. Separate helical elements corresponding to 18'—18' of Figure 5 may be disposed around the conductors C and C', respectively, in complementary relation to the parts 30—32 and 36—38 already installed thereon to constitute closed tubular portions around the conductors throughout their coextensiveness.

Turning now to Figures 13 to 21 of the drawings, there is provided a molded semi-rigid body 40 of rubber or plastic, which is provided with an elongated central body portion having a flat under surface 42 that is extended at its ends into throat portions 44—44a, which terminate in half socket bearings 46—46a. Each bearing comprises a semi-spherical concavity 48—48a having a restricted axial opening 50—50a extending outwardly through the ends of the body, as best appears in Figures 14 and 16. The top of the body portion intermediate its ends is curved as at 52—52a into the throat portions 44—44a, and is also curved in its central portions 54 in a 90° plane to afford an ellipsoidal surface upon which the helical elements 10 bear, as best appears in Figures 17 and 18. As is shown in both the latter figure and in Figure 16, this device when wrapped around a conductor of proper diameter will orient its socket half-bearings 46—46a in cooperative relationship, in which they are held by the envelope of helically-preformed elements 10 as shown in Figures 18 and 20. Before the half socket bearings 46 and 46a are closed upon each other, a rod made either in the form of Figure 19 or of Figure 21 is disposed therein. Each rod has a central portion 60 that may be solid or hollow, which terminates in ball members 62—62a at its opposite ends, respectively.

In the case of Figure 21, the central portion 60 may be composed of telescopic elements 60a and 60b, which are prevented from coming apart in the extended position by any well-known means, and which may be optionally provided with a compression spring located within the bore 64 of the hollow part 60b, as appears in Figure 21. When completely assembled, the arrangement is as shown in Figure 20, with the bar 60 extending between and connected within the sockets 46 for limited universal movement with respect thereto. The helically-preformed armor rods 10 envelop the bodies 40 and secure them to each of the conductors as shown. The throat portions 44—44a project through the parting in the armoring which maintains the complementary socket bearings in closed relation around the ball members 62 at the ends of the rod 60. Relative axial movement is thus permitted between the conductors within limits, and in the case of Figure 21 some cross-motion is afforded against the resistance of the telescoping parts, although in the fully closed position the latter always assure that the minimum spacing requirements between the conductors is maintained.

In any of the embodiments herein disclosed, it is contemplated that a tube of helically-preformed armor rods may be interposed between the conductors and the helical spacing elements as herein applied to minimize wear and chafing of the conductors. It is also contemplated that the helices of the spacing elements be made oversize with respect to the conductors so that they may be applied to the latter adjacent their supporting towers at the top of the catenary loops, and there released so as to "walk" along the conductors in response to the vibrations of the latter by gravital action until the mid-span or low point of the catenary loops is attained. Between conductors of electrically different phase or potential, insulating spacers or connectors are used; while those of the same phase, where no potential difference exists, conducting spacers or connectors may be employed. Any combination of parts with respect to conducting elements, dielectric spacer rods, and vice versa, is contemplated.

The conductors connected in the manner of the present invention may be of the same or different over-all diameters, and they may be of the same kind, or of different kinds, as to the lay and disposition of their respective parts. The spacers may be adapted as to material and as to size of helices to accord with these requirements.

I claim:
1. In a suspended line system, the combination of a pair of lines suspended in normally spaced relation, a spacing accessory removably atached to said lines, said accessory comprising a first element and a second element, each of said elements having opposite end portions helically preformed to conform to one of said lines before application thereto and normally lying along spaced different helical axes, the ends of said elements being wrapped, respectively, around said lines, said elements having portions intermediate their end portions in bridging relation to said lines.

2. The combination of claim 1, said intermediate portions bridging between said lines in crossed relation to each other.

3. The combination of claim 2, the crossed portions of said intermediate portions being locked together by helically-preformed elements.

4. The combination of claim 1, said elements defining an H-connection between said lines.

5. The combination of claim 4, said elements being respectively bent between said lines in reverse direction to constitute said H-connection.

6. The combination of claim 4, said elements being disposed respectively in U-configuration between said lines wherein the legs of the U are coaxial with said lines, and extend in opposite directions with respect to each other.

7. The combination of claim 6, in which the bridging portions of said U-configurations complement each other to constitute a substantially circular figure between said lines.

8. In a suspended line system, in combination with a pair of suspended lines, a spacer accessory to said lines comprising first and second elements, each of said elements at least for portions of its length adjacent its ends being helically preformed to an internal helical diameter to wrap around one of said lines, and of an open pitch so as to be applicable to the latter without permanent deformation of said helically-preformed portions, one of said elements having one of its end portions around one line, the other of said elements having one of its end portions wrapped around the other of said lines, both elements having their respective free ends projected from the lines toward one another, said free ends being connected together resiliently to space said lines.

9. The combination of claim 8, the connection between the free ends of said elements being effected by mutually wrapping the helically-preformed portions thereof together throughout their coextensive portions in coaxial relation.

10. The combination of claim 8, the connection between the free ends of said elements being effected by wrapping the helically-preformed portion of one element upon the adjacent end of a spacer rod, and by wrapping the helically-preformed portion of the other element about the opposite end of said spacer rod, the combination including said spacer rod for maintaining the free ends of said elements and said lines in spaced relation.

11. The combination of claim 10, said spacer rod being formed of two parts telescoped together, said parts being axially slidable with respect to each other yieldably to resist movement between said lines toward and away from each other.

12. A spacer for adjacent suspended lines comprising a connector appliance having a bearing portion surrounding one of said lines, the exterior surface of said bearing portion constituting an ellipsoid; a plurality of helically-preformed armoring elements having an internal diameter less than the external diameter of said line in surrounding relation to the latter tightly to grip the same, said elements enveloping said appliance adjacent their middle portions and extending along said line to each side thereof, and a connector bearing projected from said bearing portion extending outwardly therefrom between said armoring elements for engagement with a connector bridge attached to the adjacent line.

13. The invention of claim 12 in which said connector appliance and armor rod assembly is duplicated on adjacent lines with said bearing portion of each extending toward the other in opposed relation, said connector bridge being connected to each of said bearing portions at its opposite ends.

14. The invention of claim 13, in which said connector bearings comprise sockets, said connector bridge comprising a staff having balls at each end for engagement in said sockets.

15. The invention of claim 14, in which said staff is in two parts telescoped together.

16. The invention of claim 13, in which said connector bridge is connected to said bearings by means of a universal joint.

17. The invention of claim 12, in which said connector bearing portion is one of the complementary parts of a ball and socket joint.

18. An article of manufacture designed to bridge between adjacent suspended lines to maintain a preselected minimum spacing therebetween, comprising a first element and a second element, each of said elements having opposite end portions helically preformed to conform to one of said lines before application thereto and normally lying along spaced different helical axes, the ends of each of said elements being adapted to being wrapped, respectively, around said lines, each of said elements having a portion intermediate its respective helical end portions extending generally transversely between the helical axes of said end portions and adapted to extend when said accessory is installed, in a bridging relation between said lines.

19. An article of manufacture according to claim 18 further characterized in that said intermediate portions of said first and second elements intersect to form an X-shaped configuration.

20. An article of manufacture according to claim 18 further characterized in that said elements have a U-shaped configuration and co-operate so as to form a substantially circular configuration.

References Cited in the file of this patent

UNITED STATES PATENTS

| | | |
|---|---|---|
| 290,753 | Delany | Dec. 25, 1883 |
| 696,520 | Van Valkenburg | Apr. 1, 1902 |
| 705,073 | Grover | July 22, 1902 |
| 741,580 | Hoxie et al. | Oct. 13, 1903 |
| 806,769 | Bell | Dec. 12, 1905 |
| 1,190,135 | Faccioli | July 4, 1916 |
| 2,182,342 | Karitzky | Dec. 5, 1939 |
| 2,202,538 | Selquist | May 28, 1940 |
| 2,414,045 | Kitselman et al. | Jan. 7, 1947 |

FOREIGN PATENTS

| | | |
|---|---|---|
| 8,618 | Denmark | June 26, 1906 |
| 382,382 | France | Dec. 6, 1907 |
| 666,713 | France | May 28, 1929 |
| 504,267 | Italy | Dec. 10, 1954 |
| 739,796 | Great Britain | Nov. 2, 1955 |

(Corresponding to Italian Patent 504,267)